Figure 3:
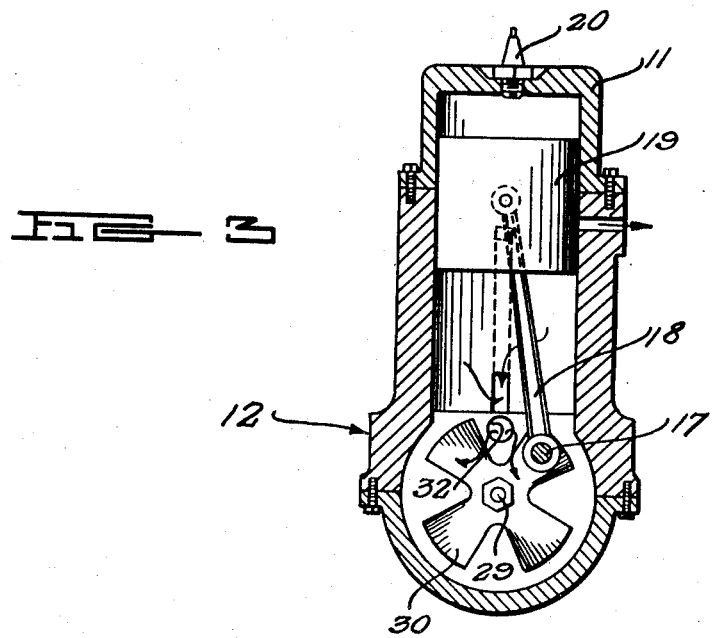

Dec. 16, 1947.  J. H. CONNELLY  2,432,725
INTERNAL-COMBUSTION ENGINE
Filed Aug. 26, 1946  2 Sheets—Sheet 1
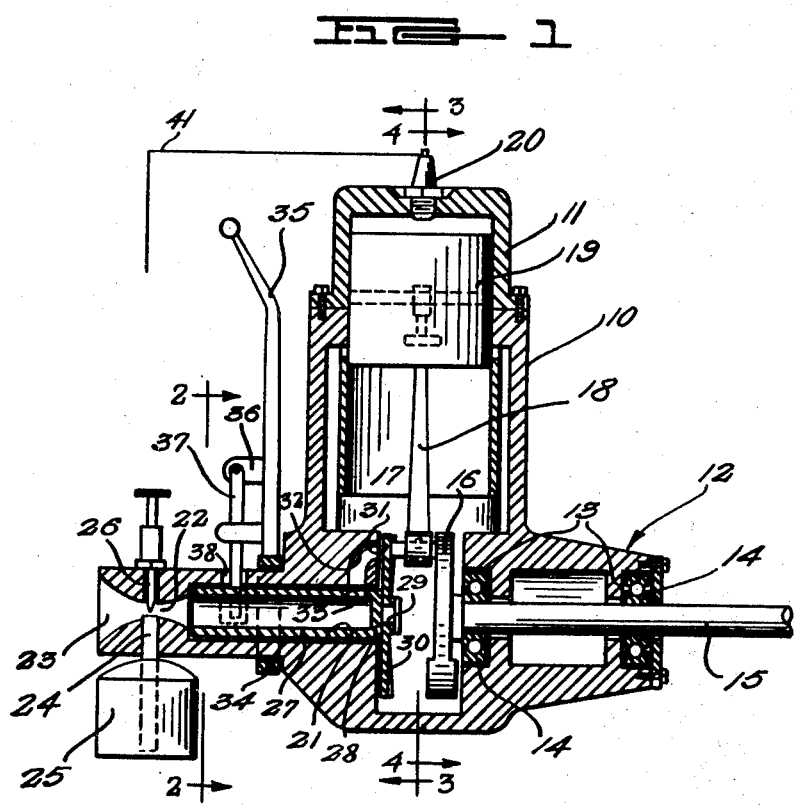
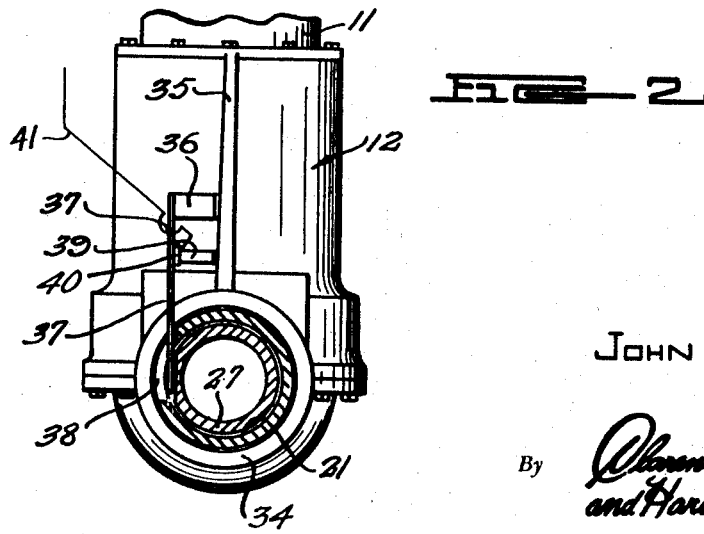
Inventor
JOHN H. CONNELLY Dec. 16, 1947.  J. H. CONNELLY  2,432,725
INTERNAL-COMBUSTION ENGINE
Filed Aug. 26, 1946   2 Sheets-Sheet 2

Inventor
JOHN H. CONNELLY

By Clarence A. O'Brien
and Harvey B. Jacobson
Attorneys

Patented Dec. 16, 1947

2,432,725

UNITED STATES PATENT OFFICE 2,432,725

INTERNAL-COMBUSTION ENGINE

John H. Connelly, Phoenix, Ariz.

Application August 26, 1946, Serial No. 693,113

6 Claims. (Cl. 123—73)

This invention relates to an internal combustion engine and more particularly to engines of the miniature two-cycle type.

The primary object of the invention is a simplified method of driving a supercharger impeller fan to force a dense mixture into the combustion chamber of the engine.

Another object is to thoroughly diffuse and atomize the combustible mixture taken into the engine, and to thereby increase the efficiency of the operation of engines of that character.

A still further object is to facilitate the starting of an internal combustion engine, and thereby avoiding the waste of energy in getting the engine into operation.

The above and other objects may be attained by employing this invention which embodies among its features an engine having a closed crank case which is provided with a combustible mixture inlet duct in axial alignment with the crank shaft and a branch duct establishing communication with the inlet duct and the interior of the crank case, a sleeve valve mounted to rotate in the inlet duct, said sleeve valve having a radial port adapted to align with the branch duct and means to rotate the sleeve valve in unison with the crank case periodically to align the port with the branch duct.

Other features include an induction fan on the sleeve valve within the crank case and means connecting the crank shaft with the fan to cause the sleeve and fan to rotate in unison with the crank shaft.

Other features include a fuel atomizer adjacent the end of the inlet duct opposite the sleeve valve, and a cam rotating in unison with the sleeve valve and a spark timer operated by the cam.

Figure 4:
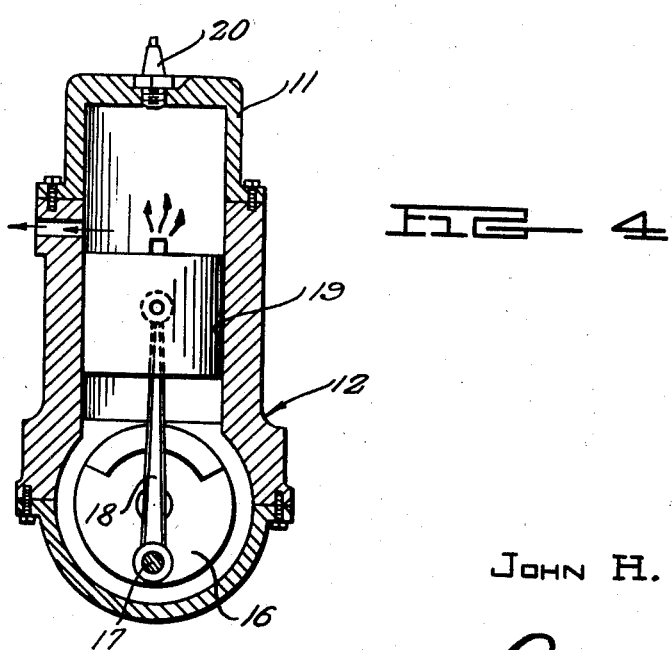

In the drawings,

Figure 1 is a longitudinal sectional view through an internal combustion engine embodying the features of this invention, Figure 2 is a sectional view taken substantially along the line 2—2 of Figure 1, Figure 3 is a sectional view taken substantially along the line 3—3 of Figure 1 and looking in the direction of the arrows, and Figure 4 is a sectional view taken substantially along the line 4—4 of Figure 1 and looking in the direction of the arrows.

Referring to the drawings in detail an internal combustion engine designated generally 10 is provided with a customary cylinder 11 opening into a crank case generally designated 12. The crank case 12 is provided in one side with longitudinally spaced recesses 13 for the reception of anti-friction bearings 14 in which a crank shaft 15 is mounted to rotate. This crank shaft is provided at its inner end with a counterbalanced crank 16 carrying a crank pin 17 to which the connecting rod 18 is attached. The end of the connecting rod 18 opposite that connected to the crank pin 17 is connected through the medium of a conventional wrist pin mounted in a conventional piston 19, and entering the end of the cylinder 11 opposite the crank case 12 is a conventional spark plug 20.

Formed in the crank case 12 opposite the crank shaft 15 and in axial alignment therewith is an axial bore 21 opening at its outer end into a venturi 22 the outer end of which communicates with an air intake opening 23. Entering the body of the crank case between the end of the bore 21 and the air intake opening 23 is a radial fuel pipe 24 the lower end of which extends into a fuel reservoir 25, while its upper end opens into the venturi 22 so that as air enters the intake opening 23 it will pass across the upper end of the pipe 24 to draw the fuel upwardly therein and atomize it in the venturi 22. A suitable needle valve 26 is arranged to regulate the flow of the atomized fuel.

Entering the inner end of the bore 21 is a sleeve valve 27, one end of which is closed by a wall 28 carrying a stud 29 which projects toward the crank shaft 15 in axial alignment therewith. An impeller fan 30 is mounted on the stud 29 to rotate with the sleeve valve 27, and one of the blades of said fan is provided with an opening 31 for the reception of an extension on the end of the crank pin 17 so that as the shaft 15 rotates the impeller will be driven in unison with the shaft.

Formed in the crank case 12 is a branch passage or duct 32 one end of which opens into the passage 21, while its opposite end opens into the crank case immediately behind the fan 30. Formed in the sleeve valve 27 is a radial opening 33 which as the sleeve rotates is adapted to be moved into registration with the branch duct 32 so as to establish communication between the interior of the sleeve 27 and the interior of the crank case. Formed on the sleeve valve 27 near the end opposite that carrying the impeller fan 30 is a flat surface forming a cam the purpose of which will be more fully hereinafter explained.

Rotatably mounted on that portion of the crank case 12 forming a portion of the wall of the bore 21 is a ring 34 carrying a hand lever 35 by means of which the ring may be moved concentrically about the axis of the bore 21. Extending outwardly from the lever 35 is a bracket arm 36 carrying adjacent its outer end a contact arm 37 the lower end of which projects downwardly through a recess 38 formed in the crank case 12 so as to engage the outer periphery of the sleeve valve in alignment with the flat surface previously referred to. Mounted on the lever 35 in spaced relation to the bracket arm 36 is an insulating block 39 carrying at its extreme outer end a contact 40, so that for the major portion of the rotation of the sleeve 27 the arm 37 will be held out of engagement with the contact 40, but when the end of the arm 37 engages the flat surface, contact will be established between the arm 37 and the contact 40. It is to be understood that the contact 40 and the arm 37 are connected in circuit with the spark plug 20 by means of a conductor 41 in order properly to time the firing of the engine.

In operation it will be understood that the engine is started in the conventional manner by rotating the crank shaft 15, thus causing the impeller fan 30 to rotate and create a draft through the interior of the sleeve 27, causing air to enter the air intake opening 23 and pass across the tube 24 to atomize the fuel in the venturi 22. The combustible mixture thus produced is introduced into the interior of the sleeve 27 and when the port 33 aligns with the passage 32 the combustible mixture will be drawn into the interior of the crank case 12 to be introduced in the conventional manner into the cylinder of the engine above the piston 19. Due to the fact that the flat surface on the sleeve 27 rotates in timed unison therewith it will be obvious that at the proper instance the arm 37 engages the contact 40 to establish an electrical discharge through the spark gap of the plug 20 so as to fire the charge of combustible mixture compressed within the cylinder 11. Due to the rotation of the impeller fan 30 within the crank case 12 it will be obvious that the combustible mixture contained therein will be agitated and the fuel therein thoroughly diffused so that a uniform and substantially homogeneous mixture is introduced into the cylinder preparatory to firing. In this way, the impeller fan not only serves in the capacity of a supercharger, but also serves to intimately mix the fuel and air forming the combustible mixture.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. The combination with an internal combustion engine having a closed crank case and a crank shaft extending through one side of the crank case, the crank case having a combustible mixture inlet duct in axial alignment with the crank shaft and a branch duct establishing communication with the inlet duct and the interior of the crank case, of a sleeve valve mounted to rotate in the inlet duct, said sleeve valve having a radial port adapted to align with the branch duct, an induction fan on the sleeve valve within the crank case and means connecting the crank shaft with the fan to cause the sleeve and fan to rotate in unison with the crank shaft.

2. The combination with an internal combustion engine having a closed crank case and a crank shaft extending through one side of the crank case, the crank case having a combustible mixture inlet duct in axial alignment with the crank shaft and a branch duct establishing communication with the inlet duct and the interior of the crank case, of a sleeve valve mounted to rotate in the inlet duct, said sleeve valve having a radial port adapted to align with the branch duct, an induction fan on the sleeve valve within the crank case and means connecting the crank shaft with the fan to cause the sleeve and fan to rotate in unison with the crank shaft, and a fuel atomizer adjacent the end of the inlet duct opposite the sleeve valve.

3. The combination with an internal combustion engine having a closed crank case and a crank shaft extending through one side of the crank case, the crank case having a combustible mixture inlet duct in axial alignment with the crank shaft and a branch duct establishing communication with the inlet duct and the interior of the crank case, of a sleeve valve mounted to rotate in the inlet duct, said sleeve valve having a radial port adapted to align with the branch duct, an induction fan on the sleeve valve within the crank case and means connecting the crank shaft with the fan to cause the sleeve and fan to rotate in unison with the crank shaft, an air inlet opening at the end of the inlet duct opposite the sleeve valve and a fuel atomizer between the air inlet opening and the sleeve valve.

4. The combination with an internal combustion engine having a closed crank case and a crank shaft extending through one side of the crank case, the crank case having a combustible mixture inlet duct in axial alignment with the crank shaft and a branch duct establishing communication with the inlet duct and the interior of the crank case, of a sleeve valve mounted to rotate in the inlet duct, said sleeve valve having a radial port adapted to align with the branch duct, an induction fan on the sleeve valve within the crank case, and a direct driving connection between the crank shaft and the fan for rotating the sleeve valve and fan in unison with the crank shaft.

5. The combination with an internal combustion engine having a closed crank case and a crank shaft extending through one side of the crank case, the crank case having a combustible mixture inlet duct in axial alignment with the crank shaft and a branch duct establishing communication with the inlet duct and the interior of the crank case, of a sleeve valve mounted to rotate in the inlet duct, said sleeve valve having a radial port adapted to align with the branch duct, a cam rotating in unison with the sleeve valve and a spark timer operated by the cam.

6. The combination with an internal combustion engine having a closed crank case and a crank shaft extending through one side of the crank case, the crank case having a combustible mixture inlet duct in axial alignment with the crank shaft and a branch duct establishing communication with the inlet duct and the interior of the crank case, of a sleeve valve mounted to rotate in the inlet duct, said sleeve valve having a radial port adapted to align with the branch duct, a cam rotating in unison with the sleeve valve, a spark timer actuated by the cam and means manually to regulate the operation of the timer by the cam.

JOHN H. CONNELLY.

REFERENCES CITED

The following references are of record in the file of this patent:

UNITED STATES PATENTS

| Number | Name | Date |
|---|---|---|
| 2,252,600 | May | Aug. 12, 1941 |
| 2,111,324 | Linthwaite | Mar. 15, 1938 |
| 2,377,833 | Warner | June 5, 1945 |

FOREIGN PATENTS

| Number | Country | Date |
|---|---|---|
| 104,091 | England | 1917 |
| 525,330 | France | 1921 |